US006751303B1

(12) United States Patent
Cook

(10) Patent No.: US 6,751,303 B1
(45) Date of Patent: Jun. 15, 2004

(54) DATA COMMUNICATION OVER TELEPHONE VOICE CHANNEL USING DTMF INTERFACE

(75) Inventor: Fred S. Cook, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 97 days.

(21) Appl. No.: 10/185,440

(22) Filed: Jun. 28, 2002

(51) Int. Cl.$^7$ ............................................. H04M 11/00
(52) U.S. Cl. ............................. 379/93.27; 379/93.26; 379/93.08; 341/52; 341/173
(58) Field of Search ........................... 379/93.01, 93.08, 379/93.15, 93.18, 93.26, 93.27, 22.02, 282–284, 386, 352, 353, 52; 341/52, 50, 57, 173; 375/289

(56) References Cited

U.S. PATENT DOCUMENTS

| 3,936,801 A | * | 2/1976 | Shuman ...................... 379/386 |
| 4,087,638 A | | 5/1978 | Hayes et al. .................... 179/2 |
| 5,249,220 A | | 9/1993 | Moskowitz et al. ........... 379/93 |
| 5,699,417 A | | 12/1997 | Khojasteh .................... 379/142 |
| 6,115,464 A | * | 9/2000 | Lester et al. ................. 379/283 |
| 6,396,921 B1 | * | 5/2002 | Longster ..................... 379/386 |

FOREIGN PATENT DOCUMENTS

| EP | 1178657 A2 | | 2/2002 | .......... H04M/3/533 |
| WO | WO 200108397 A1 | * | 2/2001 | .......... H04M/11/00 |

* cited by examiner

Primary Examiner—Wing Fu Chan

(57) ABSTRACT

A multifrequency tone generator sends data over a telephone voice channel. An alphanumeric character generator sequentially generates alphanumeric characters. Preferably, the character generator may be a keypad or keyboard. A plurality of tone generators have a summed output for transmitting a tone signal selectably including a combination of standard DTMF frequency tones, but not restricted to always having both frequency tones usually paired together by standard DTMF tones. A translation circuit is responsive to an alphanumeric character from the character generator to activate the plurality of tone generators to produce a predetermined combination of the DTMF frequency tones corresponding to the alphanumeric character wherein each bit of the binary ASCII code is represented by a respective one of the individual DTMF frequencies.

16 Claims, 3 Drawing Sheets

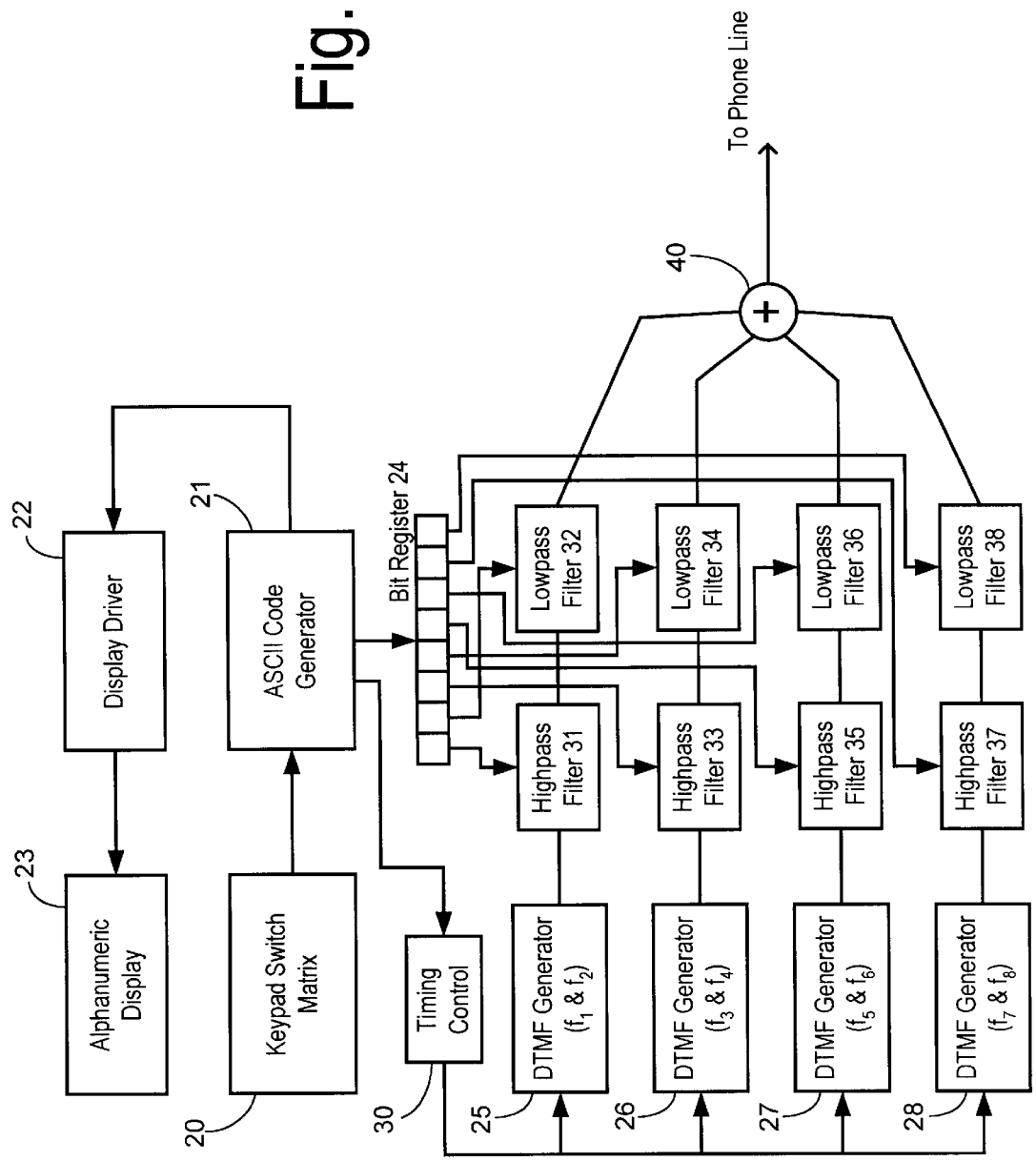

DATA COMMUNICATION OVER TELEPHONE VOICE CHANNEL USING DTMF INTERFACE

CROSS REFERENCE TO RELATED APPLICATIONS

Not applicable.

STATEMENT REGARDING FEDERALLY SPONSORED RESEARCH

Not applicable.

BACKGROUND OF THE INVENTION

The present invention relates in general to data communications over telephone voice channels, and, more specifically, to a method for signaling alphanumeric characters to an automated terminal using multiple frequency tones corresponding to standard DTMF tone frequencies.

Data communications over public switched telephone network connections typically depend upon modems at each end of the communication link. For authorizing credit card transactions, for example, a terminal at a vendor location dials a telephone number to contact a computer operated by a credit card company or bank. The vendor terminal transmits a credit card number and a charge amount. The bank terminal responds with either an authorization number or data indicating a refusal and the link is terminated. Thus, only a very small amount of data is typically exchanged (e.g., less than one hundred alphanumeric characters). Even at the slowest modem speeds, the data exchange occupies only a few seconds at most. A much greater length of time is taken up by modem initialization and synchronization (i.e., handshaking), which may take tens of seconds. Most such equipment operates at very slow modem speeds (e.g., 300 baud) because of the fact that modem synchronization occurs faster for slower modem speeds. Thus, it would be very beneficial to provide such point-to-point data communication in a way that avoids the delays of modem synchronization.

Telephone voice channels are also used by customers to order various goods or services to be delivered to the location from which they place the telephone call, such as pay-per-view cable television programs or groceries, for example. These types of orders are typically taken by a live person or utilize automated menu selections using touch-tone navigated menus, even though only a relatively small amount of data is being exchanged. Using a touch-tone system, it is very tedious to transmit data using a full character set because no more than 16 unique signals are available for transmission (i.e., the standard pairs of DTMF tones), and only 12 of these tones are available on most telephone devices. Consequently, the system expense, difficulty of use, and/or time span for placing an order may be too great to justify using such an ordering system.

SUMMARY OF THE INVENTION

The present invention has the advantages of enabling full alphanumeric communication with data processing equipment using only DTMF-capable devices and provides short transmission times without modem training, synchronization, or handshaking.

In one aspect of the invention, a multifrequency tone generator is provided for sending data over a telephone voice channel. An alphanumeric character generator sequentially generates alphanumeric characters. Preferably, the character generator may be a keypad or keyboard. A plurality of tone generators have a summed output for transmitting a tone signal selectably including a combination of standard DTMF frequency tones, but not restricted to always having both frequency tones usually paired together by standard DTMF tones. A translation circuit is responsive to an alphanumeric character from the character generator to activate the plurality of tone generators to produce a predetermined combination of the DTMF frequency tones corresponding to the alphanumeric character.

BRIEF DESCRIPTION OF THE DRAWINGS

FIG. 2 is a block diagram showing a first embodiment of a transmitter of the present invention.

DETAILED DESCRIPTION OF PREFERRED EMBODIMENTS

Figure 1:
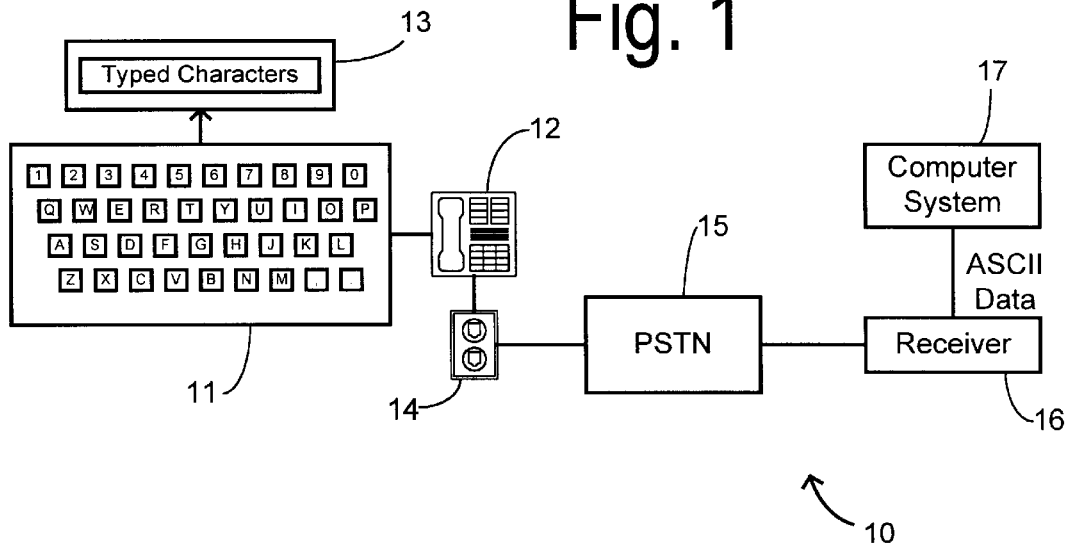
FIG. 1 is a block diagram showing a first embodiment of a data communication system of the present invention.

Referring to FIG. 1, a data communication system 10 includes a data transmission terminal 11 which may be connected to an external telephone instrument 12 or may have the functionality of a telephone instrument (e.g., number dialing and audio transducing) integrated therein. Terminal 11 may include a keypad, keyboard, touchscreen, or other device for typing or otherwise activating keys corresponding to difference alphanumeric characters. A standard QWERTY arrangement of keys or any other suitable layout can be employed. Alternatively, alphanumeric characters could be supplied by a computer system, programmed microcontroller, or other alphanumeric character generator (i.e., manual generation of individual characters is not necessary in order to use the present invention). A visual display 13, such as a segmented liquid crystal display (LCD), for displaying typed characters may also be integrated into terminal 11. Telephone instrument 12 is coupled to a public switched telephone network (PSTN) 15 via a connection point 14.

A data receiver terminal 16 is coupled to PSTN 15 and converts a tone signal received from terminal 11 into corresponding ASCII data (i.e., alphanumeric character data) and supplies it to a computer system 17 for acting upon the data. While one-way communication is shown and described herein, two-way data communication can also be provided using the methods and apparatus described herein.

Terminals 11 and 16 utilize tone signals to communicate alphanumeric character data, preferably ASCII character data. Although other tone frequencies could be employed in the present invention, use of standard DTMF tone frequencies is preferred due to the optimization of PSTN 15 to carry these standard frequencies and because of the availability of commodity DTMF generating and receiving circuits. The standard DTMF frequencies are comprised of 697 Hz, 770 Hz, 852 Hz, 941 Hz, 1209 Hz, 1336 Hz, 1477 Hz, and 1633 Hz. Conventional telephone equipment generates dual tones according to a 4×4 grid so that frequencies representing each row and each column uniquely identify a push button that is activated in the grid. A 4×4 push button matrix is used to represent 10 digits, 2 special characters (i.e., * and #), and 4 function keys usually labeled A, B, C, and D on digitally addressed telephones. The standard "dual tone" scheme is inadequate to represent the 256 alphanumeric characters of the standard ASCII character set that is used by most computer equipment.

The present invention uses each frequency of the 8 DTMF tone frequencies to represent a unique, respective bit in the 8bit ASCII character code. Thus, full set of 256 characters can be transmitted. In one preferred embodiment of a transmitting terminal shown in FIG. 2, the 8 bits representing one character are sent simultaneously within one tone signal wherein the tone signal is the summation of all tone frequencies corresponding to those bits in an ASCII character binary code that are set (i.e., are a "1"). Thus, from one up to eight tone frequencies are sent simultaneously (a bit value of all zeros is not used). The terminal includes a keypad switch matrix 20 coupled to an ASCII code generator 21. Code generator 21 may be comprised of a character map relating switch matrix locations to character codes, for example. A character (e.g., ASCII) code for a particular character being transmitted is coupled to 1) a display driver 22 which drives the characters on alphanumeric display 23, and 2) an 8-bit register 24 for holding the binary code of the particular character. Register 24 may also include a buffer for storing a queue of characters in the process of being transmitted.

A plurality of DTMF tone generators 25–28 are activated via a timing control block 30 to ensure that valid data is contained in register 24 and that the resulting tone signal meets specified on and off times for reliable transmission and detection by the receiver. In order to take advantage of commercially available DTMF tone generator integrated circuits (i.e., circuits which are only capable of generating two of the eight distinct DTMF frequencies at one time, such as the TP5088 DTMF generator available from National Semiconductor), a bank of four DTMF generators is utilized. Each generator 25–28 is assigned to two respective frequency tones. In the embodiment shown, all generators 25–28 are activated for every alphanumeric character that is transmitted and a bank of switchable blocking filters eliminates any unneeded tones from the output. The outputs from the filters are combined in a summer 40 to generate the final tone signal to be transmitted. Other embodiments are possible wherein only those generators are activated which are assigned to the needed frequencies (but if generator IC's are utilized that always generate a pair of frequencies then the blocking filters will still be required).

DTMF generator 25 generates DTMF tones at frequencies $f_1$ and $f_2$. The dual tone output is coupled to a highpass filter 31 and a lowpass filter 32. Each filter has a cutoff frequency located between $f_1$ and $f_2$, for example at $(f_1+f_2)/2$. Thus, in its normal state, each filter blocks one of the dual tones but passes the other. When both filters are in this normal state neither tone is passed to summer 40. Each filter includes a control input for causing the filter to act as an allpass filter. Highpass filter 31 has its control input connected to a first bit of register 24. In this example, the first bit is represented by DTMF frequency $f_1$. If the first bit is a zero, then highpass filter 31 stays in its blocking state and the DTMF tone at frequency $f_1$ does not reach summer 40. If the first bit is a one, then the $f_1$ tone is not blocked. The $f_1$ tone is in the normal passband of lowpass filter 32 and passes through it to summer 40 regardless of the state of lowpass filter 32.

A second bit of the ASCII code stored in register 24 is represented by DTMF frequency $f_2$. The $f_2$ tone always passes through highpass filter 31 but passes through lowpass filter 32 if the second bit has a value of one.

The remaining DTMF generators and blocking filters work in the same way in response to respective bits of register 24. It will be appreciated that a negative logic could be equivalently used. In addition, rather than filters with switchable passbands, bypass switches could be used.

Figure 3:
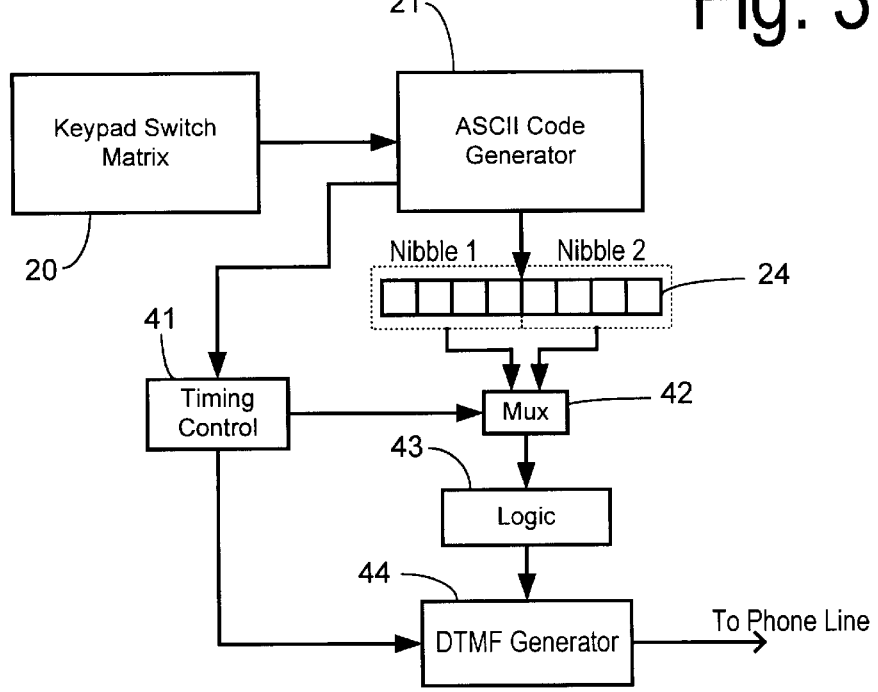
FIG. 3 is a block diagram showing a second embodiment of a transmitter of the present invention.

FIG. 3 shows an alternative embodiment requiring only one DTMF tone generator. Since there are 16 unique DTMF standard tones (i.e., frequency pairs), four bits can be represented using the tone output from one DTMF tone generator. This embodiment assigns each of the 16 DTMF tones to a respective 4-bit binary value or nibble. An ASCII character can then be represented by a combination of two serial DTMF tones.

In FIG. 3, ASCII code generator 21 places the 8-bit binary representation of an ASCII character into register 24. Register 24 is divided into a 4-bit nibble #1 and a 4-bit nibble #2. The nibbles are coupled to respective inputs of a multiplexer 42 which is controlled by a timing control 41. Control 41 is also connected to ASCII code generator 21 and DTMF generator 44. Multiplexer 42 first outputs nibble #1 to logic block 43 which converts the binary value of the nibble into an appropriate signal for commanding DTMF generator 44 to produce the DTMF tone corresponding to the nibble value. After producing the first tone for a predetermined time, nibble #2 is passed through multiplexer 42 to logic block 43 and a new corresponding command is presented to generator 44. After a predetermined off time between tones, timing control 41 activates generator 44 for a predetermined time to transmit the second serial tone. It should be noted that logic block 43 may not be necessary for some DTMF generators that are digitally controlled. The serial tones are detected and decoded using a reverse process at the receiving end.

Figure 4:
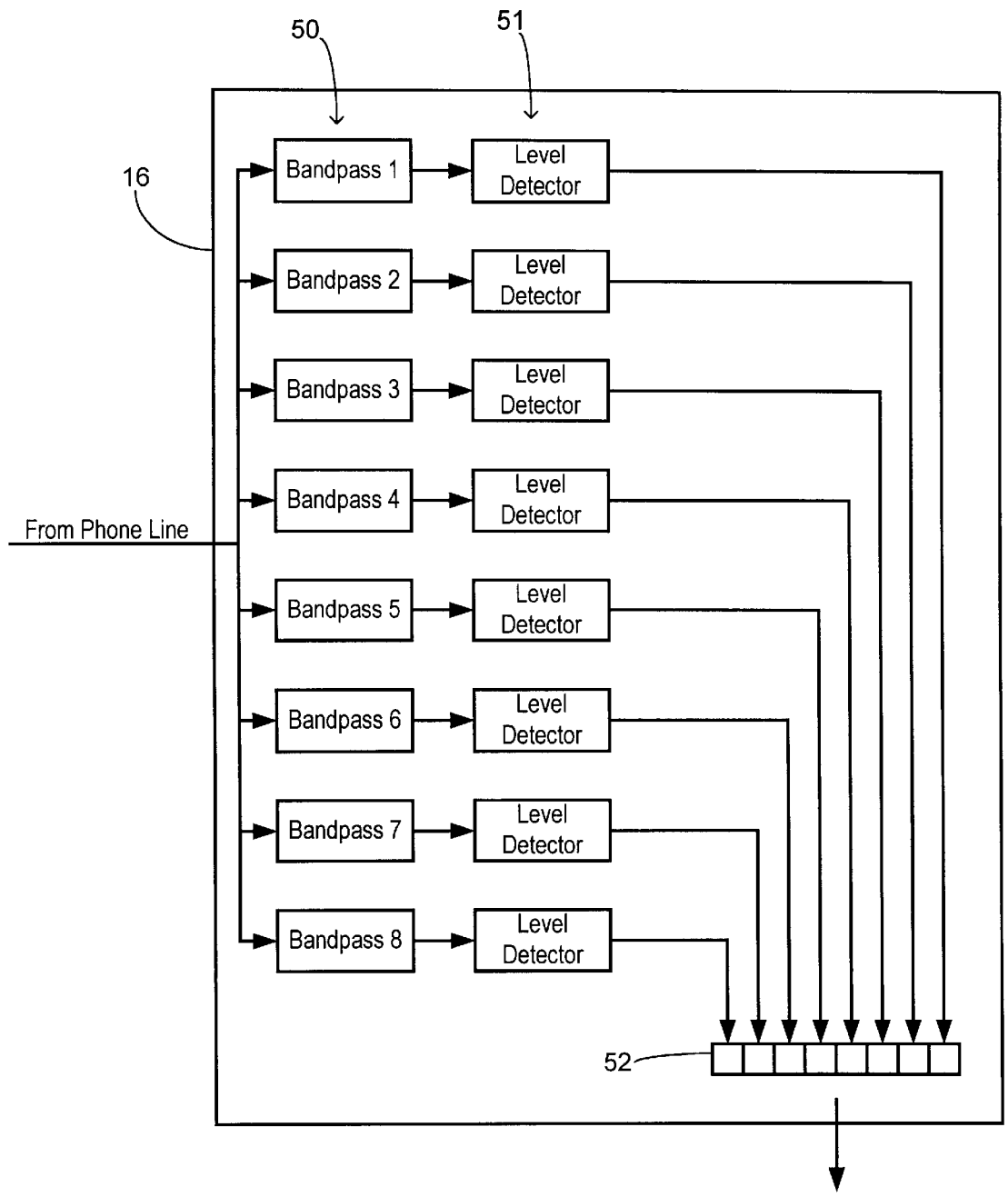
FIG. 4 is a block diagram showing a first embodiment of a receiver of the present invention.

FIG. 4 shows receiver terminal 16 in greater detail for receiving and decoding a transmission of the type transmitted by the device of FIG. 2 (i.e., up to eight tones simultaneously). A tone signal from the phone line is coupled to a bank of bandpass filters 50. Each filter 50 has a bandpass for passing through only one respective DTMF frequency (e.g., bandpass one passes frequency $f_1$, bandpass two passes frequency $f_2$, etc.). The output of each bandpass filter is coupled to a respective level detector 51 which compares the magnitude of the output of a respective bandpass filter with a threshold. If the threshold is exceeded, then the DTMF frequency is present and the level detector sets a corresponding bit is a receive register 52. The resulting binary ASCII code is coupled to a computer system for use.

Thus, the present invention provides a system for conmmunicating alphanumeric character data wherein the sending terminal does not require complicated or expensive network or computer equipment. In addition to uses for transmitting relatively small amounts of data without requiring modem synchronization, the invention can be used for secure ordering of goods or services via a telephone line. Since the originating telephone number is known, the identity of an ordering party can be verified. Furthermore, the data is sent over a private connection and not subject to interception (as is data traffic over the Internet).

What is claimed is:

1. A multifrequency tone generator for sending data over a telephone voice channel comprising:

an alphanumeric character generator for sequentially generating alphanumeric characters;

a plurality of tone generators having a summed output for transmitting a tone signal selectably including a combination of standard DTMF frequency tones corresponding to each respective alphanumeric character; and a translation circuit responsive to an alphanumeric character from said character generator for activating said plurality of tone generators to simultaneously produce a predetermined combination of said DTMF frequency tones corresponding to each of said respective alphanumeric characters;

wherein said DTMF frequency tones are comprised of eight distinct tone frequencies, wherein each distinct tone frequency represents a respective bit in an eight-bit word, and wherein said tone signal represents a particular word value in response to the presence or absence of each distinct tone frequency.

2. The tone generator of claim 1 wherein said alphanumeric character generator is comprised of a keypad having keys corresponding to each of said alphanumeric characters.

3. The tone generator of claim 2 further comprising a visual display responsive to a manual activation of one of said keys for displaying a corresponding alphanumeric character on said visual display.

4. The tone generator of claim 1 further comprising a plurality of blocking filters responsive to said translation circuit for selectably blocking predetermined tone frequencies representing respective bits not to be included in said particular word value.

5. The tone generator of claim 1 wherein said plurality of tone generators is comprised of a plurality of DTMF tone generators, wherein each DTMF tone generator generates two of said distinct tone frequencies simultaneously, and wherein said tone generator further comprises a plurality of blocking filters responsive to said translation circuit for selectably blocking predetermined tone frequencies not to be included in a particular combination.

6. The tone generator of claim 1 wherein said predetermined combination of said DTMF frequency tones corresponds to a binary code of a respective ASCII character.

7. A method of communicating alphanumeric data over a voice channel in a public switched telephone network using DTMF tones, said method comprising the steps of:

generating a particular alphanumeric character for transmission;

generating a binary bit pattern uniquely identifying said particular alphanumeric character, said binary bit pattern having a predetermined number of bits;

simultaneously activating a plurality of tone generators to produce a tone signal selectably including a combination of standard DTMF frequency tones, wherein each respective DTMF frequency tone represents a respective bit in said binary bit pattern and wherein each respective DTMF frequency tone is included or not in said tone signal in response to said generated binary bit pattern for said particular alphanumeric character;

transmitting said tone signal via said voice channel to a remote device; and decoding said tone signal in said remote device by frequency detecting each of said DTMF frequency tones to recover said binary bit pattern.

8. The method of claim 7 wherein said step of generating said particular alphanumeric character is comprised of activating a key corresponding to said particular alphanumeric character on a keyboard having a plurality of keys, each key representing a respective alphanumeric character.

9. The method of claim 7 wherein said predetermined number of bits is eight, wherein each of said tone generators generates two of said DTMF frequency tones simultaneously, and wherein said method further comprises the step of selectively filtering output signals from each of said tone generators in response to said binary bit pattern of said particular alphanumeric character to generate said tone signal.

10. The method of claim 8 further comprising the step of displaying said particular alphanumeric character on a visual display in responsive to activation of said key.

11. A system for communicating alphanumeric information over a telephonic voice channel in a public switched telephone network, comprising:

a first device comprising an alphanumeric character generator for sequentially generating alphanumeric characters, a plurality of tone generators having a summed output coupled to said voice channel for transmitting a tone signal selectably including a combination of standard DTMF frequency tones corresponding to each respective alphanumeric character, and a translation circuit responsive to an alphanumeric character from said character generator for activating said plurality of tone generators to simultaneously produce a predetermined combination of said DTMF frequency tones corresponding to each of said respective alphanumeric characters;

a second device receiving said tone signal from said voice channel and comprising a decoder for detecting the presence or absence of each of said standard DTMF frequency tones to identify said respective alphanumeric characters wherein said DTMF frequency tones are comprised of eight distinct tone frequencies, wherein each distinct tone frequency represents a respective bit in an eight-bit word, and wherein said tone signal represents a particular word value in response to the presence or absence of each distinct tone frequency.

12. The system of claim 11 wherein said alphanumeric character generator is comprised of a keypad having keys corresponding to each of said alphanumeric characters.

13. The system of claim 12 wherein said first device further comprises a visual display responsive to manual activation of one of said keys for displaying a corresponding alphanumeric character on said visual display.

14. The system of claim 11 wherein said first device further comprises a plurality of blocking filters responsive to said translation circuit for selectably blocking predetermined tone frequencies representing respective bits not to be included in said particular word value.

15. The system of claim 11 wherein said plurality of tone generators is comprised of a plurality of DTMF tone generators, wherein each DTMF tone generator generates two of said distinct tone frequencies simultaneously, and wherein said first device further comprises a plurality of blocking filters responsive to said translation circuit for selectably blocking predetermined tone frequencies not to be included in a particular combination.

16. The system of claim 11 wherein said predetermined combination of said DTMF frequency tones corresponds to a binary code of a respective ASCII character.

* * * * *